United States Patent [19]

Booth

[11] 4,206,016
[45] Jun. 3, 1980

[54] SODIUM ION CONDUCTING SODIUM BOROPHOSPHATE GLASS

[75] Inventor: Charles L. Booth, Wilmington, Del.

[73] Assignee: E. I. Du Pont de Nemours and Company, Wilmington, Del.

[21] Appl. No.: 27,940

[22] Filed: Apr. 6, 1979

Related U.S. Application Data

[63] Continuation-in-part of Ser. No. 916,914, Jun. 19, 1978, abandoned.

[51] Int. Cl.² ........................... C25B 9/00; H01M 6/20
[52] U.S. Cl. ................................. 204/1 R; 204/195 G;
204/195 S; 204/242; 429/104; 429/193
[58] Field of Search ....................... 429/191, 193, 104;
204/1 R, 195 G, 195 S, 295; 106/52, 54

[56] References Cited

U.S. PATENT DOCUMENTS

| 3,143,488 | 8/1964 | Arthur et al. ................. 204/195 G |
| 3,476,602 | 11/1969 | Brown et al. ...................... 429/104 |
| 3,829,331 | 8/1974 | Tsang ................................. 429/193 |

OTHER PUBLICATIONS

Roe, New Glass Compositions Possessing Electronic Conductivities, Journal of Electrochemical Society, vol. 112, No. 10, pp. 1005–1009, (1965).

*Primary Examiner*—Donald L. Walton

[57] ABSTRACT

Certain sodium borophosphate glasses containing 0 to 11 mole percent of one or more oxides selected from the group consisting of $ZrO_2$, MgO and $Al_2O_3$ are good ionic conductors and are resistant to molten sodium at about 300° C. Exemplary is a glass consisting of 55 mole percent of $Na_2O$, 25 mole percent of $B_2O_3$, 20 mole percent of $P_2O_5$ and 5 mole percent of $ZrO_2$.

51 Claims, 1 Drawing Figure

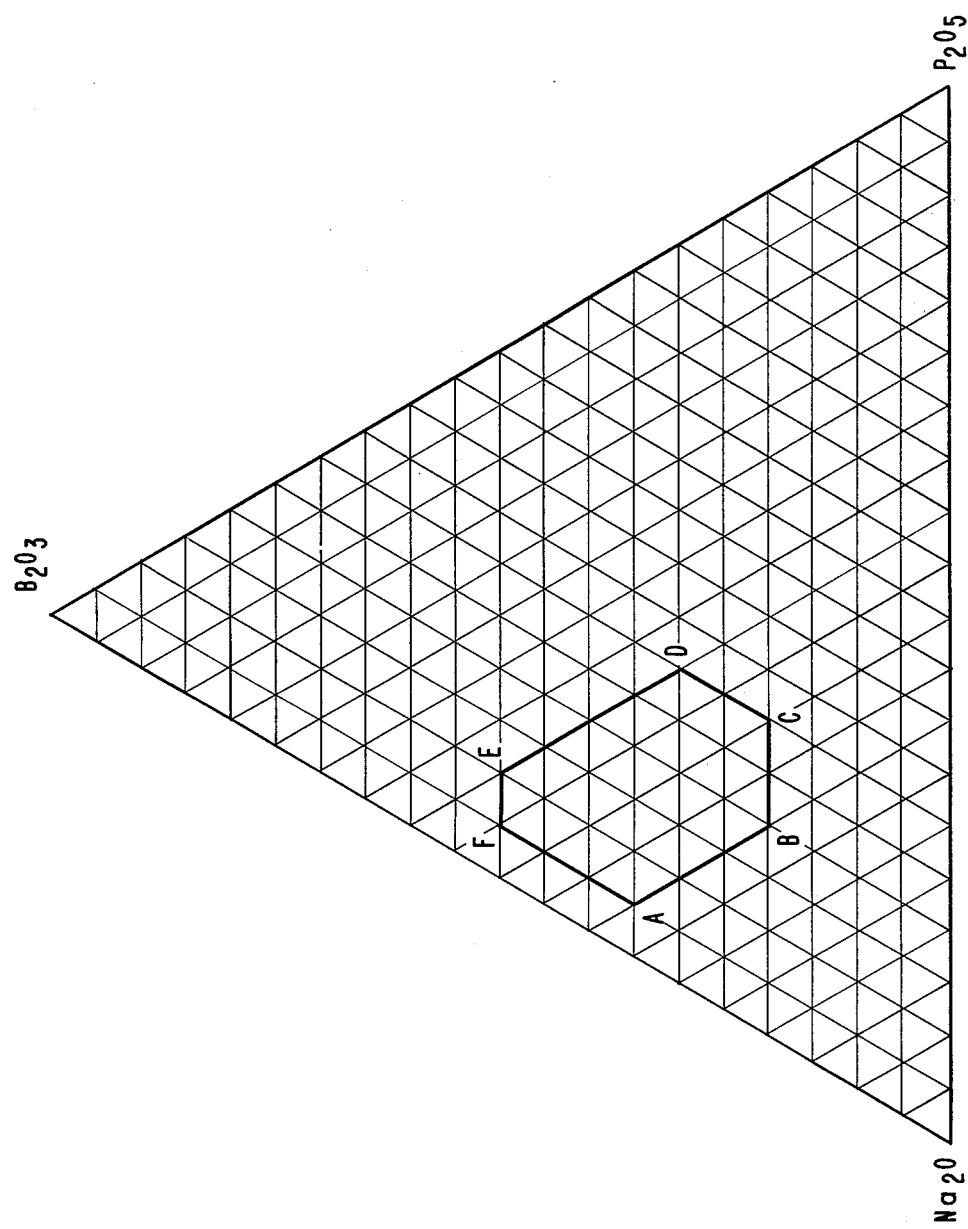

SODIUM ION CONDUCTING SODIUM BOROPHOSPHATE GLASS

CROSS-REFERENCE TO RELATED APPLICATION

This application is a continuation-in-part of application Ser. No. 916,914 filed June 19, 1978 now abandoned.

DESCRIPTION

Technical Field

This invention relates to a $Na_2O/B_2O_3/P_2O_5$ glass which can electrically conduct sodium ions and which is useful as a solid electrolyte in an electrochemical device.

Background

Solid ionic conductors with $Na^+$ as the mobile species are desirable for use as solid electrolytes in electrochemical devices.

Sodium has long been regarded as a desirable component of galvanic cells. It is inexpensive and its high reduction potential and light weight have often suggested its use as the anodic component in high energy-density storage batteries. $Na^+$ conductors, such as $\beta$-$Al_2O_3$, which are solid and are highly conductive at low temperatures are quite useful in such utilities; these conductors also serve to separate the anodic and cathodic components. (See, for example, J. T. Kummer, Prog. in Solid State Chem., 7, 141 (1972), J. T. Kummer and N. Weber, "A Sodium-Sulfur Secondary Battery" SAE Paper No. 670179, January 1967, and L. S. Marcoux and E. T. Seo, "Sodium-Sulfur Batteries", in the Amer. Chem. Soc. Monograph, Advances in Chemistry No. 140, "New Uses of Sulfur," 1975.)

Solid electrolytes are also useful in other electrochemical cells. In the electrowinning of sodium metal from a dissociable molten salt such as $NaCl-AlCl_3$, sodium ions are electrically transported from the molten salt through the solid electrolyte and converted to elemental sodium at the cathode. In purifying sodium contained in a molten alloy, such as sodium amalgam, or other source of impure sodium, sodium ions are produced at the anode and are electrically attracted through a solid electrolyte. The ions are then deposited at the cathode as pure elemental sodium.

Brown et al. in U.S. Pat. No. 3,476,602 disclose a rechargeable battery wherein the anode is molten alkali metal, the cathode is an ion conducting liquid, for example, liquid sulfur-sodium sulfide, and the solid electrolyte consists of, for example, a silicate glass of the formula $Na_2O.3SiO_2$. Levine et al. in U.S. Pat. No. 3,663,294 suggest that the silicate glass is subject to cracking and pitting, which greatly reduce the operating life of the battery, and that the cracking and pitting may be caused by an attack on the glass by alkali metal hydroxide impurities. Patentees further disclose that the operating life of such a battery can be increased by using a molten polysulfide catholyte which has a low alkali metal hydroxide content.

Borate glasses of the type $Na_2O.2B_2O_3$ containing up to 0.5 NaF or 0.15 NaCl or NaBr and borosilicate glasses of the type $2Na_2O.4SiO_2.B_2O_3$ are also known in the art. For example, Tsang in U.S. Pat. No. 3,829,331 discloses an amorphous sodium borate/sodium halide glass in which the ratio of $B_2O_3$ to $Na_2O$ varies from 1.5:1 to 4:1, which glass includes specified amounts of sodium halide, a magnesium, calcium, strontium or barium halide, an aluminum or gallium halide and, optionally, $P_2O_5$ or $SiO_2$, the halide being the fluoride, chloride or bromide, and the use of such a glass as a separator membrane in alkali metal-sulfide batteries.

Brief Description of Drawing

The FIGURE which is part of this specification shows the $Na_2O/B_2O_3/P_2O_5$ ternary diagram for the glass of this invention and, more specifically, the FIGURE shows the polygon ABCDEF which corresponds substantially to the $Na_2O/B_2O_3/P_2O_5$ composition of the glass of this invention.

Disclosure of Invention

The present invention provides a special kind of glass which is useful as a solid electrolyte and which is resistant to corrosion by molten sodium and sulfur at about 300° C. in a Na-S battery.

It has been discovered that:

(a) sodium borophosphate glass comprising about 40 to about 60 mole percent $Na_2O$, about 20 to about 50 mole percent $B_2O_3$ and about 5 to about 30 mole percent $P_2O_5$, that is, having the composition that is substantially within the polygon ABCDEF of the $Na_2O/B_2O_3/P_2O_5$ ternary diagram of the FIGURE which is part of this specification, which diagram is more specifically defined by, in mole percentages,

|   | $Na_2O$ | $B_2O_3$ | $P_2O_5$ |
|---|---------|----------|----------|
| A | 60 | 35 | 5 |
| B | 60 | 20 | 20 |
| C | 50 | 20 | 30 |
| D | 40 | 30 | 30 |
| E | 40 | 50 | 10 |
| F | 45 | 50 | 5 | and (b) such a sodium borophosphate glass containing 0 to 11 mole percent of one or more of $ZrO_2$, MgO and $Al_2O_3$, with the proviso that if the mole percent of $P_2O_5$ is 5 to 11, then the mole percent of $Al_2O_3$ is less than 5, are good ionic conductors, having a sodium ion conductivity ($\sigma_{Na+}$) of greater than $2 \times 10^{-4}$ ohm$^{-1}$ cm$^{-1}$ ($2 \times 10^{-2}$ S/m) at 300° C., and are resistant to corrosion by molten sodium and sulfur at about 300° C.

This invention also provides a method for electrically conducting sodium ions utilizing the aforesaid glass and it provides an electrochemical device having (a) two electrodes, one of which is a sodium-containing electrode capable of supplying sodium ions, (b) a solid electrolyte, which consists essentially of the aforementioned sodium ion-conducting glass, separating the two electrodes and (c) an inert electrical connector to complete an electrical circuit between the two electrodes.

As used in a battery cell, the glass electrolyte of this invention can be in the form of a thin membrane, fabricated in various orientations. The membrane can be in the form of a flat plate, corrugated sheet, spiral or other design which during operation will provide for anode metal ion transfer but will keep separate the liquid anode and cathode materials. A preferred form for the solid electrolyte is as fine, hollow glass fibers wherein the individual fibers have an outside diameter to wall thickness ratio of at least 3, ordinarily from about 3 to about 20 and preferably from about 4 to about 10. Usually, within these ratios, fibers having an outside diameter of about 20 to about 1000 microns and a wall thickness of about 5 to about 100 microns are used. Such hollow fibers provide a high strength, thin walled membrane and give a high ion conductivity. They also provide a very large surface area to volume ratio. Although less advantageous in the latter respect, fibers as large as 5000 microns outside diameter and having walls as thick as 1000 microns can be employed.

For use in a battery cell, the aforesaid hollow fibers can be fabricated into bundles of circular or rectangular prismatic or other geometric cross-sectional shapes which provide for a controlled orientation and substantially uniform spacing between fibers. The actual fabrication of the electrolyte fibers into a predetermined configuration readily can be carried out by one skilled in the art using known handling, packing and fabricating techniques. To illustrate, bundles of the fibers, each having one end closed, can be prepared having the open ends of the fibers passed through and sealed into a common header which in turn either serves as or communicates with a reservoir for anode metal. The hollow fibers can be sealed in place as a bundle in a header, for example, by adhesives, glazing or potting compounds, solder glass or high temperature thermosetting resins.

Preferred herein is a Na-S battery in which the solid electrolyte glass of the invention consists of sealed hollow fibers which contain sodium.

The sodium borophosphate glass of this invention exhibits considerable $Na^+$ conductivity. The glass has also been found to be resistant to corrosion by molten sodium at about 300° C. These properties allow the glass to be used as a solid electrolyte in batteries, coulometers, timers and display devices and in sodium-winning and sodium-purifying cells. (See M. Voinov, "Various Utilization of Solid Electrolytes" in Electron Processes in Solid State Ionics, Proc. Nato Adv. Study Institute held in Ajaccio, Corsica, Aug. 23-Sept. 9, 1975, edited by M. Kleitz and J. DuPuy, D D. Reidel Publ. Co., Boston (1976)).

The mole percentages of the three essential components $Na_2O$, $B_2O_3$ and $P_2O_5$ are chosen so as to always total 100%. Therefore, when one or more of the additives $ZrO_2$, MgO and $Al_2O_3$, is present, the total mole percent of all the components is greater than 100%. This definition procedure allows the plotting of all the glass compositions of the invention on a conventional triangular diagram. The total amount of $ZrO_2$, MgO and $Al_2O_3$ does not exceed 11 mole percent. Preferred are the composition in which the mole percentages are approximately 44-45 $Na_2O$, 45 $B_2O_3$, 10-11 $P_2O_5$ and 5-10 $ZrO_2$ and the composition in which the mole percentages are approximately 55 $Na_2O$, 25 $B_2O_3$, 20 $P_2O_5$ and 5 $ZrO_2$.

The constituent oxides or their precursors can be used as starting materials to make the glass of the invention. In the examples which follow, $NaHCO_3$, $B_2O_3$ and $(NH_4)_2HPO_4$ were used along with $Al(OH)_3$. $ZrO_2$, $ZrO(NO_3)_2$ and $ZrOCl_2$ were used to supply zirconia. The use of $ZrOCl_2$ resulted in a glass with higher corrosion resistance and higher $Na^+$ conductivity. Other useful starting materials include nitrates, carbonates and sulfates. The starting materials are weighed and then thoroughly mixed using, for example, an agate mortar and pestle, a Spex ® oscillating-type shaker or an orbital agate mill. The mixture is then placed in a crucible made from an inert material, such as platinum, alumina or kyanite. When smaller size crucibles are used, the material sometimes bubbles out when heated to melting temperatures. This can be avoided by first calcining the material at a lower temperature of about 900°-1000° C. for about 2 hours to remove volatiles. The crucible is then placed in a furnace and held at temperatures of the order of 1200°-1300° C. until the materials have completely melted. In all compositions of this invention this occurred in less than 16 hours.

As carried out herein, after melting the mixture the glass melt was quenched by pouring it onto a steel plate to form a solid glass. In some cases the thermal shock was sufficient to crack the glass into pieces that were too small to test. These experiments were repeated and the glass melt was slow-cooled from an appropriate temperature to remove stresses. The solid glass was then cut or ground to a size convenient for testing. The ac conductance was measured using a Wayne-Kerr Universal bridge at a frequency of $10^4$ radians/second. The dc conductivity was checked by applying slowly-varying voltages (triangular wave forms with a frequency less than 0.01 hz) and recording the current. The dc conductivity was calculated from the current-voltage plot. Excellent agreement with the ac results was obtained. Upon removal of the sample from the electrical apparatus, the sodium was cleaned from the glass and no apparent attack by the molten sodium was evident. Final traces of sodium were removed by using a methanol rinse.

In order to further verify resistance to sodium corrosion, glass samples were weighed to four significant figures and then placed in quartz tubes. The tubes were loaded with molten sodium at 280° C. and the glass samples were allowed to soak in the molten sodium for 48 hours. The samples were cooled and rinsed with methanol to remove excess sodium. The samples were then weighed and were judged to have sufficient sodium corrosion resistance if the weight loss was less than 0.3 wt. %. In some cases, sodium was not removed with a standard methanol rinse. In those cases an ultrasonic rinse was used for 10 minutes to remove the excess sodium. A sodium buildup of less than 0.5 wt. % was judged not detrimental. The glass of this invention falls within these limits of weight loss.

No water was used on the test samples at any time. Any water in or on the glass is likely to react with the molten sodium in any electrochemical device and decrease the corrosion resistance and conductivity of the samples. Lapping oil was used to cut and polish samples and the residual oil was removed with a methanol rinse. The test samples were all vacuum baked at or above 150° C. for at least 16 hours prior to any testing.

X-ray diffraction patterns were taken to verify that the product was indeed a glass. A sample of glass was powdered and passed through a 325 mesh screen (U.S. Sieve Series) and submitted for Norelco X-ray diffraction using copper $K\alpha$ radiation. The detector was run at a sensitivity of 500 counts full scale with a time constant of 3. Chart speed or diffractometer speed was 1° of 2θ/min. Lack of crystallinity was indicated by no recognizable peaks or insufficient peaks to permit crystal identification. The lack of crystallinity, as measured by this procedure, is especially important when pulling fine hollow fibers from the melt. In some cases the presence of crystallized material in the melt results in fibers which are not smooth, but rather, are irregular and of limited length; in other cases no fibers can be drawn from the melt or fibers which are drawn break into small pieces where crystals are occluded.

To determine the conductivity of the glass of the invention samples were prepared in the form of a rectangular prism or cylinder, with typical dimensions of about 0.5 cm for easy handling. The sample was mounted in a stainless steel holder between two disks of sodium foil 0.015" (0.381 mm) thick supported on nickel screens and the sample temperature was raised above the melting point of sodium metal to assure good contact.

The glass of this invention is useful as the solid electrolyte in electrochemical devices having two electrodes, one of which is a sodium-containing electrode capable of supplying sodium ions. The glass is readily cast in a variety of forms and is especially useful in the form of fine hollow tubes for batteries such as those disclosed in U.S. Pat. No. 3,476,602.

Best Mode

The best mode of practicing the invention is exemplified by Example 12.

EXAMPLES 1–12

The amounts of starting materials $NaHCO_3$, $B_2O_3$, $(NH_4)_2HPO_4$, $ZrO_2$, $ZrOCl_2$, $ZrO(NO_3)_2$ and $Al(OH)_3$ used in these examples are shown in Table I. The starting materials were thoroughly mixed and then placed in a platinum, alumina or kyanite crucible as indicated in Table II. If the mixture was calcined before melting, the calcining temperature is also indicated. Calcining time was about 2 hours. The crucible and contents were heated to the mixture melting temperature given in Table II and held at this temperature until the materials had melted completely. In all examples the time required was less than 16 hours. For Examples 1–8, 11 and 12, the glass melt was poured onto a steel plate to quench it into a solid piece. Examples 9 and 10 were slow-cooled from 500° C. to relieve stresses and avoid cracking of the glass.

X-ray diffraction measurements were carried out on the product glasses to verify that they were indeed glasses; no identifiable peaks were found. The mole percent of each of the constituent oxides is given in Table III and the results of the $Na^+$ conductivity ($\sigma_{Na^+}$ at 300° C.) and corrosion resistance measurements described above are given in Table IV.

TABLE I

| Ex. | Starting Material - grams | | | | |
|---|---|---|---|---|---|
| | $NaHCO_3$ | $B_2O_3$ | $(NH_4)_2HPO_4$ | $ZrO_2$ | $Al(OH)_3$ |
| 1 | 22.48 | 8.54 | 5.89 | — | — |
| 2 | 20.60 | 8.53 | 7.193 | — | — |
| 3 | 75.70 | 31.37 | 26.44 | 6.49 | — |
| 4 | 18.93 | 7.84 | 6.65 | 1.62 | — |
| 5 | 69.89 | 28.98 | 24.65 | 11.99 | — |
| 6 | 18.49 | 7.845 | 6.918 | 1.6144 | — |
| 7 | 18.49 | 7.845 | 6.918 | 3.279(a) | — |
| 8 | 18.49 | 7.845 | 6.918 | 4.193(b) | — |
| 9 | 21.843 | 9.051 | 12.944 | — | 3.432 |
| 10 | 16.632 | 4.560 | 16.114 | — | — |
| 11 | 21.40 | 4.03 | 12.24 | 1.50 | — |
| 12 | 85.59 | 16.13 | 48.92 | 6.01 | — |

(a)$ZrO(NO_3)_2$
(b)$ZrOCl_2$

TABLE II

| Ex. | Crucible | Calcine Temp. °C. | Melting Temp. °C. |
|---|---|---|---|
| 1 | $Al_2O_3$ | — | 1200 |
| 2 | $Al_2O_3$ | — | 1200 |
| 3 | Pt | — | 1200 |
| 4 | Pt | 1000 | 1300 |
| 5 | Kyanite | — | 1200 |
| 6 | $Al_2O_3$ | — | 1200 |
| 7 | $Al_2O_3$ | — | 1200 |
| 8 | $Al_2O_3$ | — | 1200 |
| 9 | Pt | 900 | 1300 |
| 10 | Pt | 900 | 1300 |
| 11 | Pt | 1000 | 1300 |
| 12 | Pt | — | 1200 |

TABLE III

| Ex. | Constituent Oxide - Mole Percent | | | | |
|---|---|---|---|---|---|
| | $Na_2O$ | $B_2O_3$ | $P_2O_5$ | $ZrO_2$ | $Al_2O_3$ |
| 1 | 48 | 44 | 8 | — | — |
| 2 | 45 | 45 | 10 | — | — |
| 3 | 45 | 45 | 10 | 5 | — |
| 4 | 45 | 45 | 10 | 5 | — |
| 5 | 45 | 45 | 10 | 9.5 | — |
| 6 | 44 | 45 | 11 | 5 | — |
| 7 | 44 | 45 | 11 | 5 | — |
| 8 | 44 | 45 | 11 | 5 | — |
| 9 | 42 | 42 | 16 | — | 7 |
| 10 | 44 | 29 | 27 | — | — |
| 11 | 55 | 25 | 20 | 5 | — |
| 12 | 55 | 25 | 20 | 5 | — |

TABLE IV

| Ex. | % Weight Change Corrosion Test | $\sigma_{Na^+}$ at 300° C. (ohm$^{-1}$ cm$^{-1}$) |
|---|---|---|
| 1 | +0.18 | $300 \times 10^{-6}$ |
| 2 | +0.30 | $350 \times 10^{-6}$ |
| 3 | — | $480 \times 10^{-6}$ |
| 4 | −0.20 | $680 \times 10^{-6}$ |
| 5 | +0.19 | $400 \times 10^{-6}$ |
| 6 | +0.27 | $260 \times 10^{-6}$ |
| 7 | +0.22 | $280 \times 10^{-6}$ |
| 8 | 0 | $510 \times 10^{-6}$ |
| 9 | +0.12 | $380 \times 10^{-6}$ |
| 10 | +0.12 | $350 \times 10^{-6}$ |
| 11 | −0.03 | $3200 \times 10^{-6}$ |
| 12 | +0.2 | $3300 \times 10^{-6}$ |

I claim:

1. Method comprising electrically conducting sodium ions through a glass whose components lie substantially within the area of the polygon ABCDEF of the $Na_2O$, $B_2O_3$ and $P_2O_5$ ternary diagram of the FIGURE of this specification, wherein the points A, B, C, D, E and F are defined by the following mole percentages:

| | $Na_2O$ | $B_2O_3$ | $P_2O_5$ |
|---|---|---|---|
| A | 60 | 35 | 5 |
| B | 60 | 20 | 20 |
| C | 50 | 20 | 30 |
| D | 40 | 30 | 30 |
| E | 40 | 50 | 10 |
| F | 45 | 50 | 5 | the mole percent of the components within the polygon totaling 100%, said glass containing 0 to 11 mole percent of one or more oxides selected from the group consisting of $ZrO_2$, MgO and $Al_2O_3$, with the proviso that if the mole percent of $P_2O_5$ is 5 to 11, then the mole percent of $Al_2O_3$ is less than 5, said glass having a sodium conductivity of greater than $2 \times 10^{-4}$ ohm$^{-1}$ at 300° C.

2. The method of claim 1 wherein the glass has the mole percentages of Na₂O, B₂O₃ and P₂O₅ of 60, 35 and 5, respectively.

3. The method of claim 1 wherein the glass has the mole percentages of Na₂O, B₂O₃ and P₂O₅ of 60, 20 and 20, respectively.

4. The method of claim 1 wherein the glass has the mole percentages of Na₂O, B₂O₃ and P₂O₅ of 50, 20 and 30, respectively.

5. The method of claim 1 wherein the glass has the mole percentages of Na₂O, B₂O₃ and P₂O₅ of 40, 30 and 30, respectively.

6. The method of claim 1 wherein the glass has the mole percentages of Na₂O, B₂O₃ and P₂O₅ of 40, 50 and 10, respectively.

7. The method of claim 1 wherein the glass has the mole percentages of Na₂O, B₂O₃ and P₂O₅ of 45, 50 and 5, respectively.

8. The method of claim 1 wherein the glass contains $ZrO_2$.

9. The method of claim 1 wherein the glass contains MgO.

10. The method of claim 1 wherein the glass contains $Al_2O_3$.

11. The method of claim 1 wherein the glass has the following mole percentages: Na₂O about 44–45; B₂O₃ about 45; P₂O₅ about 10–11; and the ZrO₂ about 5–10.

12. The method of claim 1 wherein the glass has about 55 mole percent of Na₂O, about 25 mole percent of B₂O₃, about 20 mole percent of P₂O₅ and about 5 mole percent of ZrO₂.

13. The method of claim 1 wherein the glass has the mole percentages of Na₂O, B₂O₃ and P₂O₅ of 48, 44 and 8, respectively.

14. The method of claim 1 wherein the glass has the mole percentages of Na₂O, B₂O₃ and P₂O₅ of 45, 45 and 10, respectively.

15. The method of claim 1 wherein the glass has the mole percentages of Na₂O, B₂O₃ and P₂O₅ of 44, 45 and 11, respectively.

16. The method of claim 1 wherein the glass has the mole percentages of Na₂O, B₂O₃ and P₂O₅ of 44, 29 and 27, respectively.

17. The method of claim 1 wherein the glass has the mole percentages of Na₂O, B₂O₃ and P₂O₅ of 55, 25 and 20, respectively.

18. The method of claim 1 wherein the glass has the mole percentages of Na₂O, B₂O₃ and P₂O₅ of 42, 42 and 16, respectively.

19. The method of claim 1 wherein the glass has the mole percentages of Na₂O, B₂O₃, P₂O₅ and ZrO₂ of 45, 45, 10 and 5, respectively.

20. The method of claim 1 wherein the glass has the mole percentages of Na₂O, B₂O₃, P₂O₅ and ZrO₂ of 45, 45, 10 and 9.5, respectively.

21. The method of claim 1 wherein the glass has the mole percentages of Na₂O, B₂O₃, P₂O₅ and ZrO₂ of 44, 45, 11 and 5, respectively.

22. The method of claim 1 wherein the glass has the mole percentages of Na₂O, B₂O₃, P₂O₅ and ZrO₂ of 55, 25, 20 and 5, respectively.

23. The method of claim 1 wherein the glass has the mole percentages of Na₂O, B₂O₃, P₂O₅ and Al₂O₃ of 42, 42, 16 and 7, respectively.

24. In an electrochemical device having (a) two electrodes, one of which is a sodium-containing electrode capable of supplying sodium ions, (b) a solid electrolyte separating the two electrodes and (c) an inert electrical connector to complete an electrical circuit between the two electrodes, the improvement wherein the solid electrolyte consists essentially of the sodium ion conducting glass whose components lie substantially within the area of the polygon ABCDEF of the Na₂O, B₂O₃ and P₂O₅ ternary diagram of the FIGURE of this specification, wherein the points A, B, C, D, E and F are defined by the following mole percentages:

|   | Na₂O | B₂O₃ | P₂O₅ |
|---|------|------|------|
| A | 60   | 35   | 5    |
| B | 60   | 20   | 20   |
| C | 50   | 20   | 30   |
| D | 40   | 30   | 30   |
| E | 40   | 50   | 10   |
| F | 45   | 50   | 5    | the mole percent of the components within the polygon total 100%, said glass containing 0 to 11 mole percent of one or more oxides selected from the group consisting of ZrO₂, MgO and Al₂O₃, with the proviso that if the mole percent of P₂O₅ is 5 to 11, then the mole percent of Al₂O₃ is less than 5, said glass having a sodium ion conductivity of greater than $2 \times 10^{-4}$ ohm$^{-1}$ cm$^{-1}$ at 300° C.

25. The device of claim 24 wherein the glass has the mole percentages of Na₂O, B₂O₃ B₂O₃ and P₂O₅ of 60, 35 and 5, respectively.

26. The device of claim 24 wherein the glass has the mole percentages of Na₂O, B₂O₃ and P₂O₅ of 60, 20 and 20, respectively.

27. The device of claim 24 wherein the glass has the mole percentages of Na₂O, B₂O₃ and P₂O₅ of 50, 20 and 30, respectively.

28. The device of claim 24 wherein the glass has the mole percentages of Na₂O, B₂O₃ and P₂O₅ of 40, 30 and 30, respectively.

29. The device of claim 24 wherein the glass has the mole percentages of Na₂O, B₂O₃ and P₂O₅ of 40, 50 and 10, respectively.

30. The device of claim 24 wherein the glass has the mole percentages of Na₂O, B₂O₃ and P₂O₅ of 45, 50 and 5, respectively.

31. The device of claim 24 wherein the glass contains ZrO₂.

32. The device of claim 24 wherein the glass contains MgO.

33. The device of claim 24 wherein the glass contains Al₂O₃.

34. The device of claim 24 wherein the glass has the following mole percentages: Na₂O about 44–45; B₂O₃ about 45; P₂O₅ about 10–11; and ZrO₂ about 5–10.

35. The device of claim 24 wherein the glass has about 55 mole percent of Na₂O, about 25 mole percent of B₂O₃, about 20 mole percent of P₂O₅ and about 5 mole percent of ZrO₂.

36. The device of claim 24 wherein the glass has the mole percentages of Na₂O, B₂O₃ and P₂O₅ of 48, 44 and 8, respectively.

37. The device of claim 24 wherein the glass has the mole percentages of Na₂O, and P₂O₅ of 45, 45 and 10, respectively.

38. The device of claim 24 wherein the glass has the mole percentages of Na₂O, B₂O₃ and P₂O₅ of 44, 45 and 11, respectively.

39. The device of claim 24 wherein the glass has the mole percentages of $Na_2O$, $B_2O_3$ and $P_2O_5$ of 44, 29 and 27, respectively.

40. The device of claim 24 wherein the glass has the mole percentages of $Na_2O$, $B_2O_3$ and $P_2O_5$ of 55, 25 and 20, respectively.

41. The device of claim 24 wherein the glass has the mole percentages of $Na_2O$, $B_2O_3$ and $P_2O_5$ of 42, 42 and 16, respectively.

42. The method of claim 24 wherein the glass has the mole percentages of $Na_2O$, $B_2O_3$, $P_2O_5$ and $ZrO_2$ of 45, 45, 10 and 5, respectively.

43. The device of claim 24 wherein the glass has the mole percentages of $Na_2O$, $B_2O_3$, $P_2O_5$ and $ZrO_2$ of 45, 45, 10 and 9.5, respectively.

44. The device of claim 24 wherein the glass has the mole percentages of $Na_2O$, $B_2O_3$, $P_2O_5$ and $ZrO_2$ of 44, 45, 11 and 5, respectively.

45. The device of claim 24 wherein the glass has the mole percentages of $Na_2O$, $B_2O_3$, $P_2O_5$ and $ZrO_2$ of 55, 25, 20 and 5, respectively.

46. The device of claim 24 wherein the glass has the mole percentages of $Na_2O$, $B_2O_3$, $P_2O_5$ and $Al_2O_3$ of 42, 42, 16 and 7, respectively.

47. The device of claim 24 which is an electrolytic cell.

48. The device of claim 24 which is a galvanic cell.

49. The device of claim 24 wherein the anode is sodium and the cathode is sulfur.

50. The device of claim 24 wherein the solid electrolyte is in the form of sealed hollow fibers, the anode is sodium contained within the fibers and the cathode is sulfur.

51. The galvanic cell of claim 48 having the solid electrolyte in the form of sealed hollow fibers containing molten sodium as the anode and the cathode is molten sulfur.

* * * * *